Aug. 6, 1968    G. W. MEYERS    3,395,932
LOAD TIE-DOWN APPARATUS
Filed Jan. 3, 1966    2 Sheets-Sheet 1
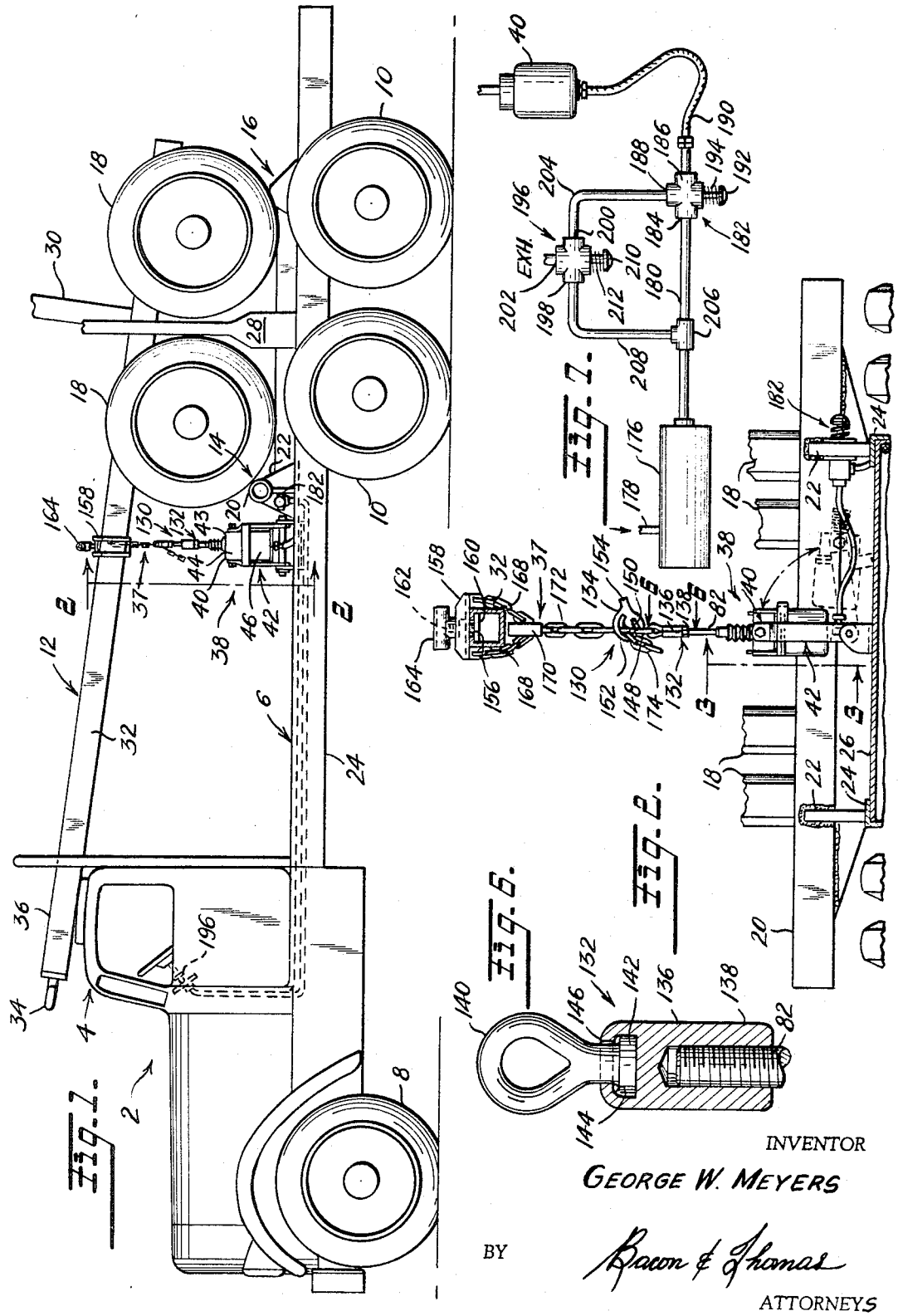
INVENTOR
GEORGE W. MEYERS
BY
Bacon & Thomas
ATTORNEYS

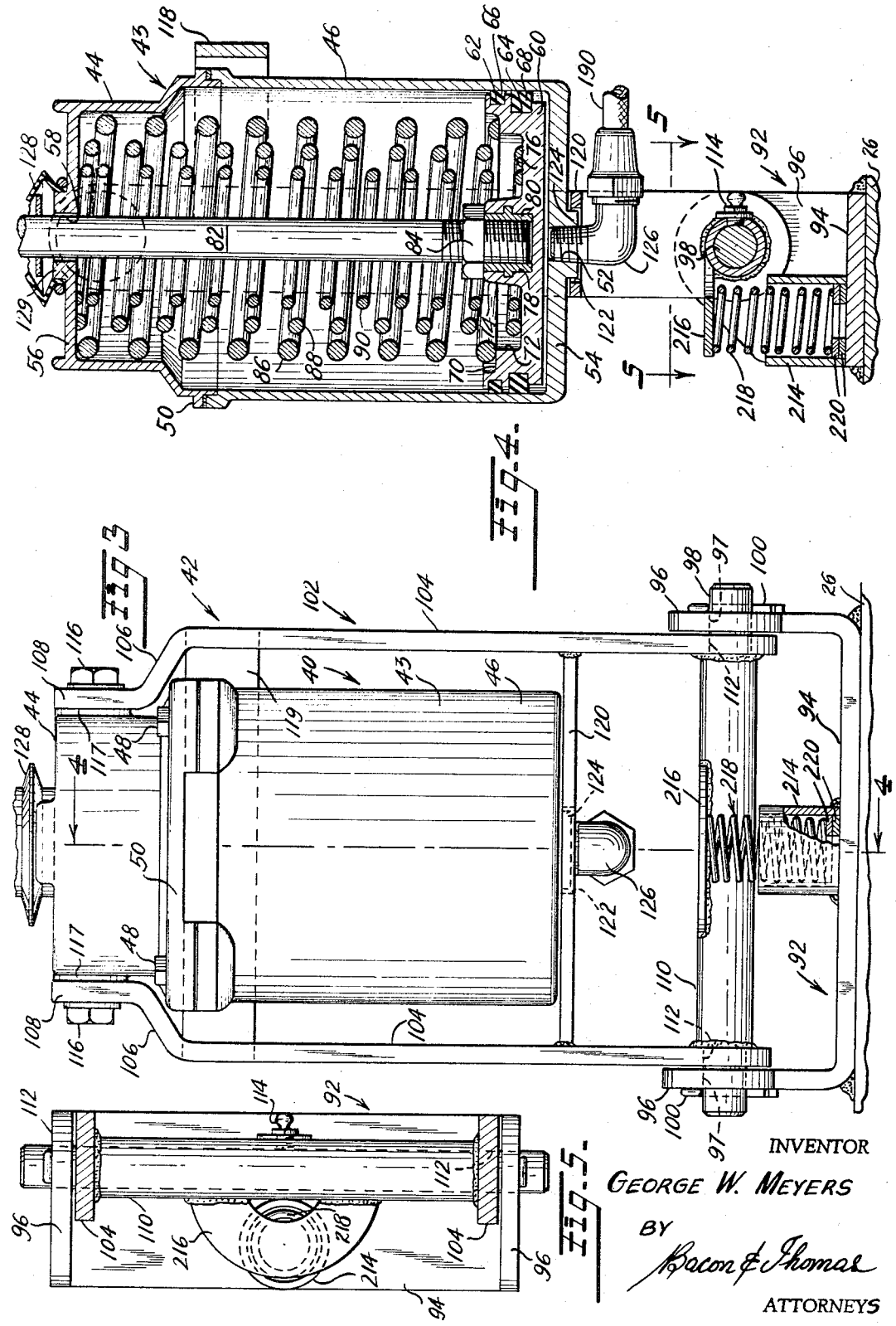

United States Patent Office 3,395,932
Patented Aug. 6, 1968

3,395,932
LOAD TIE-DOWN APPARATUS
George W. Meyers, 222 S. 8th St.,
Redmond, Oreg. 97756
Filed Jan. 3, 1966, Ser. No. 518,237
8 Claims. (Cl. 280—179)

ABSTRACT OF THE DISCLOSURE

Apparatus for exerting a resilient pulling force on a tie element, comprising a pair of telescoped members, one of which has means on its outer end for connecting the tie element thereto. The other member is anchored to a base, and a resilient element is arranged to urge the two members to telescope toward each other, whereby a resilient force is placed on the tie element. Force exerting means, which can be fluid pressure operated, is connected with the members and is operable remotely to urge them apart against the force of the resilient element, to thereby create slack so that the tie element can be connected to said one member.

---

This invention relates generally to apparatus for securing in position a load carried on the load bed of a truck, or the like. More particularly, it relates to load tie-down apparatus to be mounted on a load bed and which when in operation continuously exerts a resilient pulling force on the free end of a tie element with which it is coupled, to thereby secure in position a load carried on the load bed and engaged by the tie element, the apparatus of the invention being remotely operable to provide sufficient slack for coupling to and uncoupling from the tie element.

While the present load tie-down apparatus can be used to secure different kinds of loads to a load bed, the embodiment of the invention herein described is particularly designed to secure in position a logging trailer being hauled on a truck load bed. The logging industry utilizes truck and trailer combinations to haul large logs from the site of logging operations to a mill or the like, where the truck and trailer are emptied. The empty truck and trailer then return to the logging site to pick up another load of logs to be transported. When making the return trip the empty logging trailer is usually detached from its normal towing position behind the truck, and is placed on the truck load bed for hauling. The tie-down apparatus of the invention is designed to secure the logging trailer in position on the truck load bed, utilizing a resilient clamping force which will absorb load shifts.

It is a principal object of the invention to provide load tie-down apparatus for securing a load to a load bed, designed to continuously exert a resilient securing force capable of absorbing shocks and load shifts, and including remotely operable means arranged to temporarily overcome the resilient force to provide slack for coupling and uncoupling.

Another object is to provide a load tie-down apparatus, including a spring-loaded unit arranged to continuously exert a resilient pulling force on a tie element connected therewith.

A further object is to provide tie-down apparatus for securing a load to the load bed of a truck, designed to exert a continuous resilient pulling force on a tie element with which it is coupled, and arranged to be operated remotely either from the truck cab or the load bed to provide sufficient slack for coupling the apparatus with and uncoupling it from said tie element.

Still another object is to provide a bracket for mounting the spring-loaded unit of the invention, designed so that after the unit has been uncoupled from a tie element it will automatically be moved into a retracted position.

Other objects and many of the attendant advantages of the invention will become readily apparent from the following detailed description, when taken in connection with the accompanying drawings, wherein:

FIG. 1 is a side elevational view of the load tie-down apparatus installed on the load bed of a truck to hold a logging trailer in position thereon;

FIG. 2 is an enlarged, fragmentary vertical sectional view taken along the line 2—2 in FIG. 1, with the retracted position for the spring-loaded unit being indicated by dashed lines;

FIG. 3 is a fragmentary, enlarged elevational view, partly in section, taken along the line 3—3 in FIG. 2;

FIG. 4 is a vertical sectional view taken along the line 4—4 in FIG. 3, showing the construction of the spring-loaded unit, and of the mounting bracket therefor;

FIG. 5 is a horizontal sectional view taken along the line 5—5 in FIG. 4;

FIG. 6 is an enlarged vertical sectional view through the swivel connection attached to the upper end of the piston rod, taken along the line 6—6 in FIG. 2; and FIG. 7 is a diagrammatic view of the pneumatic control circuit for the invention.

Referring now to the drawings, a truck is indicated at 2 having a cab 4 and a load bed 6, and includes front wheels 8 and rear wheels 10. The truck 2 is of the type commonly employed in the logging industry, and is designed for use in conjunction with a logging trailer 12 to haul large logs, the trailer being towed behind the truck 2 when hauling logs.

When the truck 2 and the logging trailer 12 are empty and are to travel on a highway, the trailer will normally be loaded onto the bed 6. For this purpose, and to support logs carried thereby, the load bed 6 is provided with front and rear, transversely extending rests 14 and 16, respectively, between which the wheels 18 of the logging trailer 12 can be cradled. The front rest 14 comprises a cylindrical pipe 20 supported by brackets 22 so that the longitudinal axis of the pipe is positioned a substantial distance above the load bed 6, the brackets 22 being welded to a pair of confronting channel irons 24 which constitute the side members of the load bed 6. The members 24 are bridged by a transverse member 26, positioned in front of the front rest 14. Vertical standards 28 extend upwardly from the opposite sides of the load bed 6 in the region of the wheels 10 and function to help hold in place logs carried on said load bed, the logging trailer 12 having similar vertical standards 30 thereon.

The logging trailer 12 includes a rectangular central beam 32 which extends along the longitudinal axis thereof, and which terminates in a hitch element 34 for connecting the logging trailer to a mating hitch element (not shown) mounted on the rear of the truck 2. The forward end 36 of the beam 32 inwardly from the hitch element 34 rests on the roof of the cab 4 when the logging trailer 12 is loaded on the load bed 6, and a tie element 37 is suspended from the beam 32 and is coupled with the tie-down apparatus 38 of the invention. The apparatus 38 is mounted on the member 26, and is operable to exert a resilient pulling force on the tie element 37 for securing the trailer 12 to the load bed 6.

The apparatus 38 includes a spring-loaded unit 40 mounted on the transverse member 26 by a bracket 42, the unit 40 including a housing 43 comprised of confronting upper and lower sections 44 and 46, respectively, secured together by bolts 48 which pass through a flange 50 carried on the upper housing 44, and which are received within threaded bores in the lower section 46. The lower section 46 has a centrally positioned threaded inlet port 52 in the bottom wall 54 thereof, and the top wall 56 of the upper section 44 has a centrally positioned bore 58 extending therethrough.

Received within the lower housing section 46 is a piston 60, provided on the periphery thereof with annular grooves 62 and 64 which receive seals 66 and 68, respectively, that slidably engage the inner cylindrical surface of said lower section. The upper face of the piston 60 has therein an outer circular recess 70, and a reduced inner recess 72. A boss 74 projects upwardly from the bottom wall 76 of the inner recess 72, and has an axial bore 78 therein within which an internally threaded bushing 80 is secured. The lower end of a piston rod 82 is threaded into the bushing 80, and is secured in position by a lock nut 84.

The unit 40 is designed so that the piston 60 and its attached piston rod 82 will be continuously urged downwardly by a large resilient force. To this end the housing 43 contains a plurality of coil springs 86, 88 and 90, the two inner springs 88 and 90 having their lower end seated on the bottom wall 76 of the inner recess 72, and their upper end seated on the inner face of the top wall 56 about the bore 58. The outer spring 86, which is substantially stronger than the two inner springs, has its upper end seated on the underface of the top wall 56, and its lower end is received in the circular recess 70. The combined forces of the springs 86, 88 and 90 urge the piston 60 and the piston rod 82 downwardly into the cylindrical housing 43, a typical value for the combined resilient forces of the springs being 2,400 pounds.

The bracket 42 for mounting the spring-loaded unit 40 includes a U-shaped base 92, including a horizontal portion 94 welded centrally on the channel member 26 to extend longitudinally of the load bed 6, and upstanding ears 96 at each of said horizontal portions. A horizontally disposed pivot shaft 98 is received through aligned bores 97 in the ears 96 and is secured in position by keys 100 at the opposite ends thereof, the longitudinal axis of the shaft 98 extending at a right angle to the transversely extending rests 14 and 16.

Mounted on the pivot shaft 98 is a frame 102, which includes a pair of parallel arms 104 having inwardly bent portions 106 near the upper ends thereof that terminate in parallel end portions 108. The lower ends of the arms 104 are connected by a cylindrical tube 110 welded therebetween, and the upper ends thereof are connected by a U-shaped member 118 welded in position just below the bent portions 106. The lower ends of the arms 104 have bores 112 therethrough that communicate with the interior of the tube 110, and the pivot shaft 98 is received through the bores 112 and the tube 110 to pivotally mount the frame 102 on the base 92. The tube 110 has a grease fitting 114 thereon for supplying lubricant to the interface between the pivot shaft 98 and the internal wall of the tube 110.

The housing 43 of the unit 40 is received within the frame 42, with the end portions 108 of the arms 104 being secured by bolts 116 to bosses 117 on opposite sides of the upper housing section 44. A transverse bar 120 extends between the vertical arms 104, and is spaced slightly from the bottom of the housing 43. The bar 120 has a bore 122 therethrough, within which is loosely received a boss 124 carried by the housing 43 about the inlet port 52. An elbow fitting 126 is threaded into the inlet port 52, to conduct fluid pressure to the region beneath the piston 60.

The piston rod 82 extends upwardly through the bore 58 and projects from the housing 43, a flexible boot 128 being connected between said piston rod and a boss 129 on the housing 43 to keep dust and other foreign matter from entering the bore 58. Secured to the upper end of the piston rod 82 is apparatus 130 for detachably connecting the rod with the tie element 37, said apparatus including a swivel connection 132, and a hook 134.

The upper end of the piston rod 82 is threaded to receive the swivel connection 132, the connection 132 including an internally threaded cylindrical member 136 having a wrench-engaging surface 138 on the lower end thereof. A loop element 140 is connected with the member 136, the element 140 having a flange 142 on the lower end thereof which is received within a recess 144 in the upper end of the member 136, the recess 144 having an inturned flange 146 at its upper end which engages behind the flange 142 to establish a swivel connection between the loop element 140 and the member 136.

The hook 134 is connected to the loop element 140 by a conventional chain link 148, said hook 134 including an arcuate groove 150 within which the link 148 is engaged, and a hook arm 152 which extends generally parallel with the arcuate groove 150, and which can be engaged with the tie element 37. The rear end 154 of the hook 134 is weighted, so that when there is no pulling force being exerted on the chain link 148 by the unit 40 the hook 134 will automatically shift to uncouple the arm 152 from the tie element 37. Such automatically uncoupling hooks are commercially available, and hence will not be described in further detail herein.

The rectangular beam 32 of the logging trailer 12 has a longitudinally extending slot 156 in the top surface thereof, and a downwardly facing U-shaped bracket 158 is slidably received on said beam and supports the tie element 37. An anchor plate 160 is received within the beam 32, and a stud 162 attached thereto extends upwardly through the slot 156 and through a bore in the bracket 158. A T-headed nut 164 is threaded onto the stud 162, and by tightening the nut the bracket 158 can be secured in any desired position along the beam 32, over the length of the slot 156.

The tie element 37 includes a pair of chain sections 168 welded to the opposite sides of the bracket 158, and which extend downwardly to a member 170, to which they are welded. A single chain section 172 is connected with the chain sections 168, and extends downwardly toward the unit 40. Thus, when the hook 134 is coupled with the lower free end 174 of the chain section 172, and the unit 40 exerts a resilient pulling force on the tie element 37, the logging trailer 12 will be firmly secured to the truck load bed 6.

The hook 134 is connected with the lower free end 174 of the tie element 37 by first driving the piston 60 upwardly to extend the pston rod 82, which moves the connecting apparatus 130 upwardly to provide sufficient slack to snugly couple the hook 134 with said free end 174. The piston 60 is moved upwardly by supplying air pressure through the elbow fitting 126, which air pressure function to urge the piston 60 upwardly against the force exerted by the springs 86, 88 and 90. After the hook 134 has been closely coupled with the free end 174, the air pressure within housing 43 is relieved. The springs 86, 88 and 90 then urge piston 60 downwardly, placing a large resilient pulling force on the time element 37.

The truck 2 is equipped with apparatus for generating air pressure, which is then supplied to a storage tank 176 through a supply conduit 178. Connected with the outlet of the tank 176 is a conduit 180 having a first control valve 182 connected thereto, the control valve 182 being mounted on one of the brackets 22 supporting the pipe 20, so that it is located adjacent to the unit 40. The control valve 182 includes an inlet port 184, an outlet port 186 and an exhaust port 188, the inlet port 184 being connected with the conduit 180, and the outlet port 186 being connected by a flexible conduit 190 to the elbow fitting 126. The control valve unit 182 is manually operated by a plunger 192, the plunger 192 being urged by a spring 194 into a "Normal" position wherein the outlet port 186 is connected with the exhaust port 188, so that any air pressure within the housing 43 will be exhausted through the port 188.

A second control valve 196 is mounted in the cab 4 of the truck 2, and is identical in construction to the control valve 182. The valve 196 includes an inlet port 198, an outlet port 200 and an exhaust port 202, and the exhaust port 188 of the first control valve 182 is connected with the outlet port 200 of the control valve unit 196 by a conduit 204. The conduit 180 has a T-fitting 206 connected therein in front of the inlet port 184 of the valve 182, and a conduit 208 extends from said fitting 206 to the inlet port 198 of the control valve 196. The control valve 196 includes a manually operated plunger 210, urged by a spring 212 into a "Normal" position wherein the outlet port 200 is connected with the exhaust port 202.

The air control circuit of the invention is designed so that either of the control valve units 182 or 196 can be used to control the unit 40, whereby said unit can be operated either from the cab 4, or by an operator standing by the truck bed 6 near the control valve 182. When it is desired to supply air pressure to the housing 43 for urging the piston 60 upwardly, either the plunger 192 or the plunger 210 is depressed into its "Actuated" position.

Assuming that the plunger 192 is depressed, the valve unit 182 is designed so that exhaust port 188 will then be closed, and so that the inlet port 184 will be connected with the outlet port 186 to supply air pressure through the conduit 190 to the housing 43, which air pressure will function to urge the piston 60 upwardly to provide the slack for coupling the hook 134 with, or uncoupling it from, the free end 174 of the tie element 37. The piston rod 82 will remain in its extended position for as long as the plunger 192 is held in its "Actuated" position. When the plunger 192 is released, the spring 194 will shift the same to its "Normal" position, and the conduit 190 will then be connected to the exhaust port 188, and thence to the exhaust port 202 through the conduit 204 and the passages of the control valve 196. Air pressure will then be relieved within the housing 43, and the springs 86, 88 and 90 will then urge the piston 60 toward its original position.

If the control valve 196 is chosen to operate the unit 40, the plunger 210 thereof will be depressed, resulting in the closing of the exhaust port 202, and in the connection of the inlet port 198 with the outlet port 202. Air pressure will then flow through the conduit 204, the exhaust port 188, the outlet port 186, and the conduit 190 to the inlet port of the housing 43. Upon release of the plunger 210, air pressure will be relieved within housing 43 through the conduit 190, the passages of the control valve 182, the conduit 204, and the exhaust port 202. Thus, it is seen that either of the control valve units 182 or 186 can provide complete control over the operation of the spring-loaded unit 40.

In operation, the bracket frame 102 is pivoted about the shaft 98 so that the piston rod 82 assumes a vertical position. With the logging trailer 12 in position on the truck load bed 6, and with the tie element 37 suspended in vertical alignment with the piston rod 82, either one of the control valve units 182 or 196 is operated to urge the piston 60 upwardly against the continuous resilient force of the coil springs 86, 88 and 90. The hook 134 is then coupled with the free end 174 of the tie element 37, so that said tie element is as taut as possible, and the air pressure within the housing 43 is then relieved. The coil springs 86, 88 and 90 will then urge the piston 60 and the piston rod 82 downwardly, resulting in the exertion of a large, continuous resilient pulling force on the tie element 166.

The resilient pulling force exerted on the tie element 37 tightly secures the trailer 12 in position on the truck load bed 6. Further, because the pulling force is resilient, any slack occurring in the tie element 37 because of shifting of the logging trailer 12, or the like, will be rapidly absorbed, as will any vertical vibrations between the load and the truck 2. The continuous resilient pulling force exerted by the coil springs 86, 88 and 90 is entirely independent of the air pressure control system, insuring that the load will be safely tied down continuously until such time as the resilient force exerted by such springs is relieved, regardless of whether or not air pressure should fail.

When it is desired to uncouple the hook 134 from the tie element 37, either one of the valves 182 and 196 is actuated to pressurize the housing 43, which causes the piston rod 82 to move upwardly against the continuously applied force of the coil springs 86, 88 and 90. With the upward movement of the piston rod 82, sufficient slack is provided so that the hook 134 will automatically disconnect from the tie element 37, and thereafter the piston 60 is allowed to return to its original position by relieving air pressure within the housing 43.

In the event the air pressure control system should fail, uncoupling can be effected by manipulating the swivel connection 132. Initially, the member 136 is threaded fully onto the upper end of the piston rod 82. Slack for uncoupling can thus be obtained by backing off the element 136, the swivel connection between the loop 140 and the member 136 readily permitting such. The length of the member 136 is preferably selected so that sufficient slack to uncouple the hook 134 can be obtained without disconnecting said member from the piston rod. Obviously, emergency coupling of the hook 134 with the free end 174 of tie element 37 can be obtained by reversing the procedure described.

After the hook 134 has been uncoupled from the tie element 37, the frame 102 and the unit 40 are urged into a retracted position, as indicated by dashed lines in FIG. 2, so as to lie below the top surface of the rests 14 and 16. Thereafter, a load of logs or the like can be disposed on said rests, without danger of causing damage to the unit 40. The bracket 42 includes resilient means for urging frame 102 to move from its erect, vertical position into its horizontal, retracted position, said means being shown in detail in FIGS. 3-5.

Secured to the base portion 94 centrally thereof, and spaced laterally from the longitudinal axis of the shaft 98, is a short upright cylinder 214, the top edge of said cylinder terminating below the shaft 98. Welded to the surface of the tube 110 to extend substantially tangentially therefrom is a semiannular plate 216, said plate 216 being disposed to be substantially horizontal when the frame 102 is in its erect, vertical position.

Received within the cylinder 214 is the lower end of a coil spring 218, the upper end of said spring projecting from the cylinder 210 and being engaged by the plate 216 when the frame 102 is in its erect position, the spring 218 being compressed by said plate 216 when the frame 102 is in an erect, vertical position. After the hook 134 has been uncoupled from the tie element 37, which frees the frame 102 to pivot, the compressed coil spring 218 reacts against the plate 216 to urge the frame 102 to pivot into its horizontal, retracted position. The force exerted by the coil spring 218 is adjusted to the desired valve by placing shim washers 220 therebeneath, the number and thickness of said shim washers being chosen so that the coil spring 218 will exert the amount of force necessary to move the frame 102 into its horizontal, retracted position.

It is seen that a load tie-down apparatus has been provided which will continuously exert a resilient pulling force on a tie element. It is to be understood that while the invention has been described in connection with securing a logging trailer 12 to a load bed 6, it might also be equally well employed to tie down other types of loads. In every instance, the invention is utilized to exert a continuous resilient pulling force on a tie element, and is operable remotely to release the resilient pulling force to provide slack for coupling and uncoupling.

Obviously, many modifications and variations of the present invention are possible in the light of the above teachings. It is, therefore, to be understood that within the scope of the appended claims the invention may be practiced otherwise than as specifically shown and described.

I claim:
1. In combination: apparatus to be connected with the free end of a tie element and operable to exert a resilient pulling force thereon, including: a pair of telescopically arranged members; means on the outer end of one of said members for detachably connecting said one member with the free end of a tie element; means anchoring the other of said members, said one member being telescopically movable relative to said other member in a first direction away from said other member and toward the free end of a tie element, and in a second direction toward said other member, said other member comprising a cylinder and said one member comprising a rod having a piston on the inner end thereof, said piston being slidably received within said cylinder; and resilient means arranged to continuously urge said one member in said second direction, whereby to place a resilient pulling force on the free end of a tie element coupled by said connecting means with said outer end of said one member; and means connected with said apparatus and operable remotely to move said one member in said first direction against the continuous force of said resilient means to provide slack for effecting coupling and uncoupling of said connecting means with the free end of a tie element, including: a source of fluid pressure; conduit means connecting said source with said cylinder; and at least one valve connected in said conduit means, and operable to either admit fluid pressure to or drain fluid pressure from said cylinder.

2. The combination as recited in claim 1, wherein said connecting means is constructed and arranged to automatically uncouple from a tie element with which it was coupled when said first member is moved in said first direction to provide said slack.

3. In combination: a bed for receiving a load; a tie element engageable with a load disposed on said bed and including a free end, said tie element being arranged so that when a pulling force is exerted on the free end thereof a load disposed on said bed and engaged by said tie element will be secured to said bed; apparatus attached to said bed and operable to exert a resilient pulling force on said free end of said tie element, including: a pair of telescopically arranged members; means on the outer end of one of said members for detachably connecting said one member with the free end of said tie element; bracket means securing the other of said members to said bed, said one member being telescopically movable relative to said other member in a first direction away from said other member and toward said free end of said tie element, and in a second direction toward said other member and away from said free end of said tie element, said other member comprising a cylinder and said one member comprising a rod having a piston on the inner end thereof, said piston being slidably received within said cylinder; and resilient means arranged to continuously urge said one member in said second direction, whereby to place a resilient pulling force on said free end of said tie element when said free end is coupled by said connecting means with said outer end of said one member; and means connected with said apparatus, operable remotely to move said one member in said first direction against the continuous force of said resilient means to provide slack for effecting coupling and uncoupling of said connecting means with said free end of said tie element, including: a source of fluid pressure; conduit means connecting said source with said cylinder; and at least one valve connected in said conduit means, and operable to either admit fluid pressure to or drain fluid pressure from said cylinder.

4. The combination as recited in claim 3, wherein said bracket means includes: a base secured to said bed; a frame pivotally connected to said base, and carrying said other member, said frame being movable between an erect position and a retracted position; and resilient means arranged to move said frame from said erect position to said retracted position when said connecting means is uncoupled from said free end of said tie element.

5. The combination as recited in claim 3, wherein said connecting means includes an extendable portion operable manually to provide slack for effecting coupling and uncoupling thereof with said free end of said tie element.

6. In combination: a truck having a cab, and a bed for receiving a load; a trailer received on said bed, said trailer including wheels, and said bed having spaced rests thereon for receiving said trailer wheels; a tie element connected with said trailer and including a vertically suspended free end extending toward and spaced above said bed; apparatus attached to said bed and operable to exert a resilient pulling force on said free end of said tie element, including: a pair of telescopically arranged members; means on the outer end of one of said members for detachably connecting said one member with the free end of said tie element; bracket means securing the other of said members to said bed, said one member being telescopically movable relative to said other member in a first direction away from said other member and toward said free end of said tie element, and in a second direction toward said other member and away from said free end of said tie element, said other member comprising a cylinder and said one member comprising a rod having a piston on the inner end thereof, said piston being slidably received within said cylinder, and said bracket means including: a base attached to said bed in front of and below the top of said rests; a frame pivotally connected at its lower end to said base, to pivot about an axis extending longitudinally of said bed between an erect, vertical position and a retracted, horizontal position, said cylinder being carried within said frame; and resilient means arranged to urge said frame, and said cylinder carried thereby, to pivot from said erect position to said retracted position; and resilient means arranged to continuously urge said one member in said second direction, whereby to place a resilient pulling force on said free end of said tie element when said free end is coupled by said connecting means with said outer end of said one member; and means connected with said apparatus, operable remotely to move said first member in said first direction against the continuous force of said resilient means to provide slack for effecting coupling and uncoupling of said connecting means with said free end of said tie element.

7. The combination as recited in claim 6, wherein said resilient means for urging said frame to pivot comprises: a vertically disposed coil spring mounted on said base at a position spaced from said pivotal axis, and having a substantial portion of the upper end thereof exposed; and a plate mounted on said frame, said plate being spaced from said pivotal axis and being arranged to engage and compress said coil spring when said frame is in said erect, vertical position.

8. The combination as recited in claim 6, wherein said remotely operable means includes: a source of fluid pressure; conduit means connecting said source with said cylinder; and a pair of control valves connected in said conduit means and each operable to supply fluid pressure to and exhaust fluid pressure from said cylinder, one of said valves being located in said cab and the other being mounted on said bed.

References Cited

UNITED STATES PATENTS

| | | | |
|---|---|---|---|
| 2,094,407 | 9/1937 | Nampa | 105—368 |
| 2,805,035 | 9/1957 | Coombs | 248—361 |
| 3,239,237 | 3/1966 | Spencer | 280—179 |
| 3,275,284 | 9/1966 | Gary | 280—179 |

BENJAMIN HERSH, *Primary Examiner.*

L. D. MORRIS, *Assistant Examiner.*